United States Patent [19]

Machado et al.

[11] Patent Number: 5,245,641
[45] Date of Patent: Sep. 14, 1993

[54] SPENT FUEL STORAGE RACK

[75] Inventors: Octavio J. Machado, Pensacola, Fla.;
Clifford W. Henry, Metairie, La.;
Ray L. Congleton, Cantonment;
William M. Flynn, Pensacola, both of Fla.

[73] Assignee: Westinghouse Electric Corp., Pittsburgh, Pa.

[21] Appl. No.: 427,168

[22] Filed: Oct. 26, 1989

Related U.S. Application Data

[60] Division of Ser. No. 149,982, Jan. 29, 1988, Pat. No. 4,900,505, which is a continuation of Ser. No. 728,141, Apr. 26, 1985, abandoned, which is a continuation of Ser. No. 570,406, Jan. 12, 1984, abandoned, which is a continuation of Ser. No. 333,544, Dec. 22, 1981, abandoned.

[51] Int. Cl.$^5$ .............................................. G21C 19/06
[52] U.S. Cl. ...................................... 376/272; 403/252
[58] Field of Search .............. 376/272, 233, 260, 261, 376/268; 250/506.1, 507.1; 403/252, 349, 353; 294/906, 86.4, 93, 97

[56] References Cited

U.S. PATENT DOCUMENTS

| | | | |
|---|---|---|---|
| 1,102,079 | 6/1914 | Rizer | 403/353 |
| 2,120,623 | 6/1938 | Oxford et al. | 403/349 |
| 3,859,533 | 1/1975 | Suvanto | 376/272 |
| 4,034,227 | 7/1977 | Soot | 376/272 |
| 4,068,878 | 1/1978 | Wilner | 376/272 |
| 4,081,086 | 3/1978 | Shallenberger et al. | |
| 4,143,276 | 3/1979 | Mollon | |
| 4,243,889 | 1/1981 | Weber | |
| 4,305,787 | 12/1981 | Rivacoba | |
| 4,319,960 | 3/1982 | Larson et al. | |
| 4,342,620 | 8/1982 | Vickrey | |
| 4,356,062 | 10/1982 | Bosshard | 376/272 |
| 4,366,115 | 12/1982 | Schlumpf | |
| 4,382,060 | 5/1983 | Holtz et al. | |
| 4,399,366 | 8/1983 | Bucholz | |
| 4,746,487 | 5/1988 | Wachter | |
| 4,820,472 | 4/1989 | Machado et al. | 376/272 |

FOREIGN PATENT DOCUMENTS

| | | |
|---|---|---|
| 0071364 | 2/1983 | European Pat. Off. |
| 2742736 | 4/1979 | Fed. Rep. of Germany |
| 1023179 | 1/1960 | France ............ 326/272 |

Primary Examiner—Harvey E. Behrend

[57] ABSTRACT

A spent fuel rack for storing fresh fuel assemblies, or spent fuel assemblies removed from a nuclear reactor, which includes a base plate having multiple cells of modular construction welded at their bottom ends to the plate. The cells are formed of L-shaped sections having walls which support neutron absorbing material, and the walls of one cell are common to the adjacent cells. The base plate includes openings primarily for receiving the bottom nozzle of a fuel assembly, but they further serve as access openings for apparatus used for leveling the base plate. There is also means for receiving and locking the engaging mechanism of lifting apparatus which means is wholly within the periphery of the base plate.

3 Claims, 6 Drawing Sheets

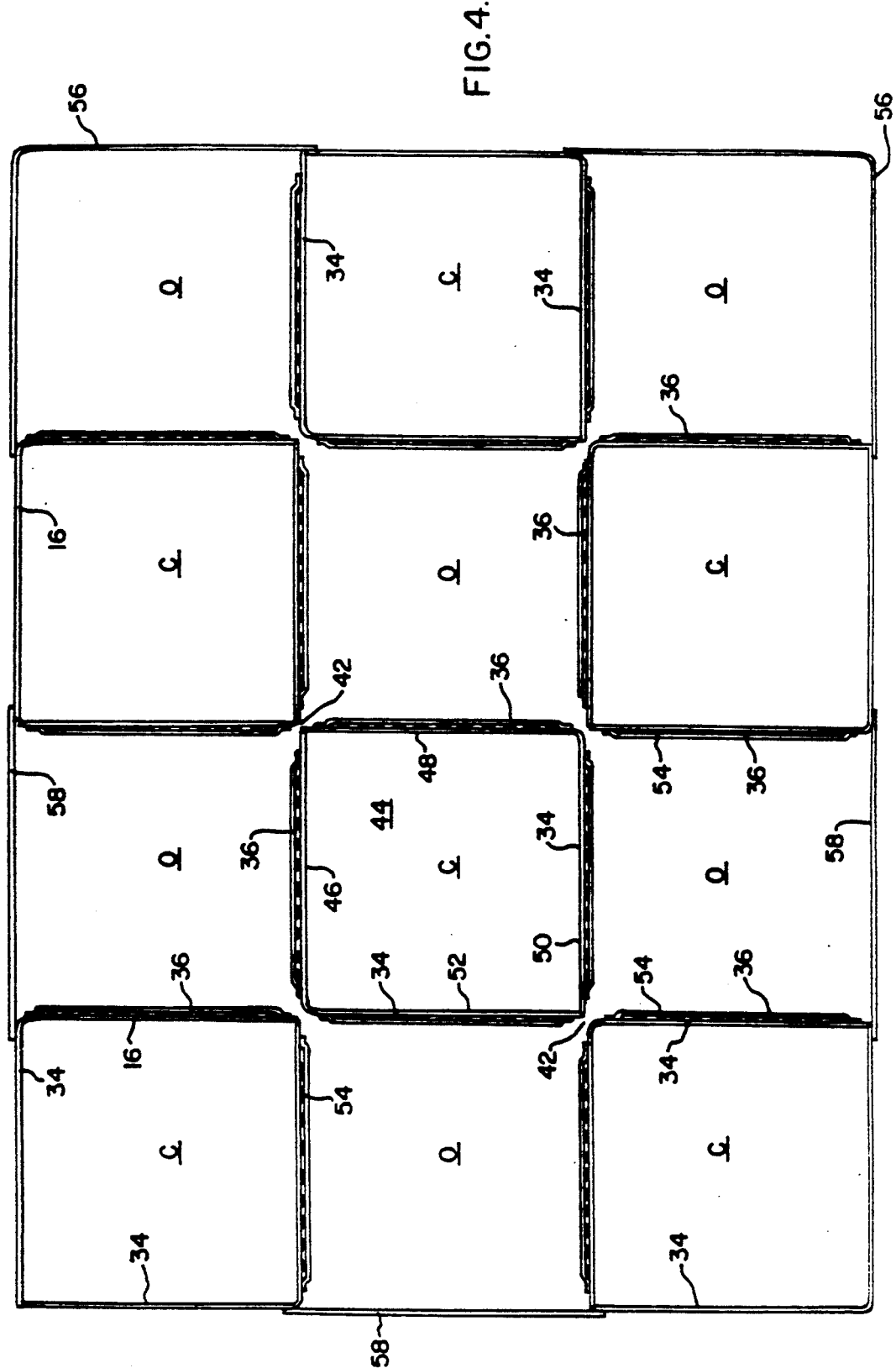

SPENT FUEL STORAGE RACK

This application is a division of application Ser. No. 07/149,982 filed Jan. 29, 1988 now U.S. Pat. No. 4,900,505 granted Feb. 13, 1990, which is a continuation of application Ser. No. 06/728,141 filed Apr. 26, 1985, which is a continuation of application Ser. No. 06/570,406 filed Jan. 12, 1984, which is a continuation of application Ser. No. 333,544 filed Dec. 22, 1981. Applications Ser. Nos. 728,141, 570,406 and 333,544 are abandoned.

CROSS-REFERENCE TO RELATED APPLICATIONS

This application is closely related to the disclosure in application Ser. No. 282,991 filed Jul. 14, 1981 now U.S. Pat. No. 4,820,472 granted Apr. 11, 1989, assigned to the assignee by the present invention.

BACKGROUND OF THE INVENTION

The invention described herein relates to spent fuel storage racks and more particularly to an improved design of racks particularly adapted for storage of fuel assemblies of the type used in boiling water reactors.

The delays in undertaking the reprocessing of reactor spent fuel in the United States has required utilities to better utilize the spent fuel storage space at a reactor site in a way to permit the storage of larger quantities of fuel in the same given area. The delays also have provided the economic incentive to increase the storage capacity and thus better control the handling and disposition of spent fuel and costs associated therewith. Initially, plant designers typically included at the reactor site, a spent fuel pool sized to receive a number of spent fuel assemblies less than the total amount expected to be removed from the reactor during its lifetime. The fuel assemblies were located on centers or at a pitch such that the space between assemblies together with the water surrounding each fuel assembly was sufficient to maintain the fuel in a non-critical condition. At this spacing, subcriticality was maintained by utilizing only water as a moderator. As the need for compact storage increased, the first stage of capacity expansion included the use of stainless steel cells for containing each fuel assembly thus permitting reduced spacing between fuel assemblies. This reduction increased the storage capacity by simply changing the design of storage racks without increasing the size of the storage pool. As decisions concerning reprocessing continued to be delayed, greater compaction of fuel assemblies into the allotted pool space was accomplished by applying neutron absorbing materials to the walls of the stainless steel containers or cells which were made to a size to just accept a fuel assembly. This design permitted cells to be spaced on a pitch even less than previous rack designs thus increasing the storage capacity to the extent where the storage pool could accommodate about 10 years of spent fuel.

To provide stability and support to prior spent fuel racks, a common arrangement was such that the spent fuel cells were laterally spaced from each other by structural members extending in X and Y directions to thus provide cell support. The egg crate arrangement of cells thus formed allows one fuel assembly to be located in each cell designed to specific tolerances. However, the structural members still utilize space which otherwise could be used more efficiently for fuel assembly storage purposes. Also, fuel racks of the foregoing design contain substantial labor and material content which is reflected in greater manufacturing costs.

The parent application provides a spent fuel rack module for overcoming the foregoing disadvantages. This module includes a checkerboard array of cells, each cell sized to accept a fuel assembly. Neutron absorbing material on the walls of each cell serves also to absorb the neutrons from assemblies stored in adjacent cells. The cells of the module are mounted on and secured to a base plate. The underside of the base plate has means at selected positions of the base plate for receiving and locking mechanisms for lifting the module accessible through holes in the base plate. This means includes blocks secured to the underside of the base plates in which the mechanisms are engaged.

SUMMARY OF THE INVENTION

In accordance with this invention, the means for receiving and locking the mechanism for lifting the module including the blocks is wholly within the periphery of the base plate. The spacing between modules is thus minimized.

BRIEF DESCRIPTION OF THE DRAWINGS

While the foregoing discussion identifies problems presently existing in the prior art together with a general description of how they may be overcome, it is believed that this invention will be better understood with the aid of the following disclosure of the preferred embodiment of this invention with reference to the accompanying drawings, wherein:

FIG. 4 is a plan view of a portion of the modular structure shown in FIGS. 1 and 2 illustrating how the cells are formed and positioned prior to being structurally interconnected to arrive at the modular structure;

DESCRIPTION OF THE PREFERRED EMBODIMENT

Figure 1:
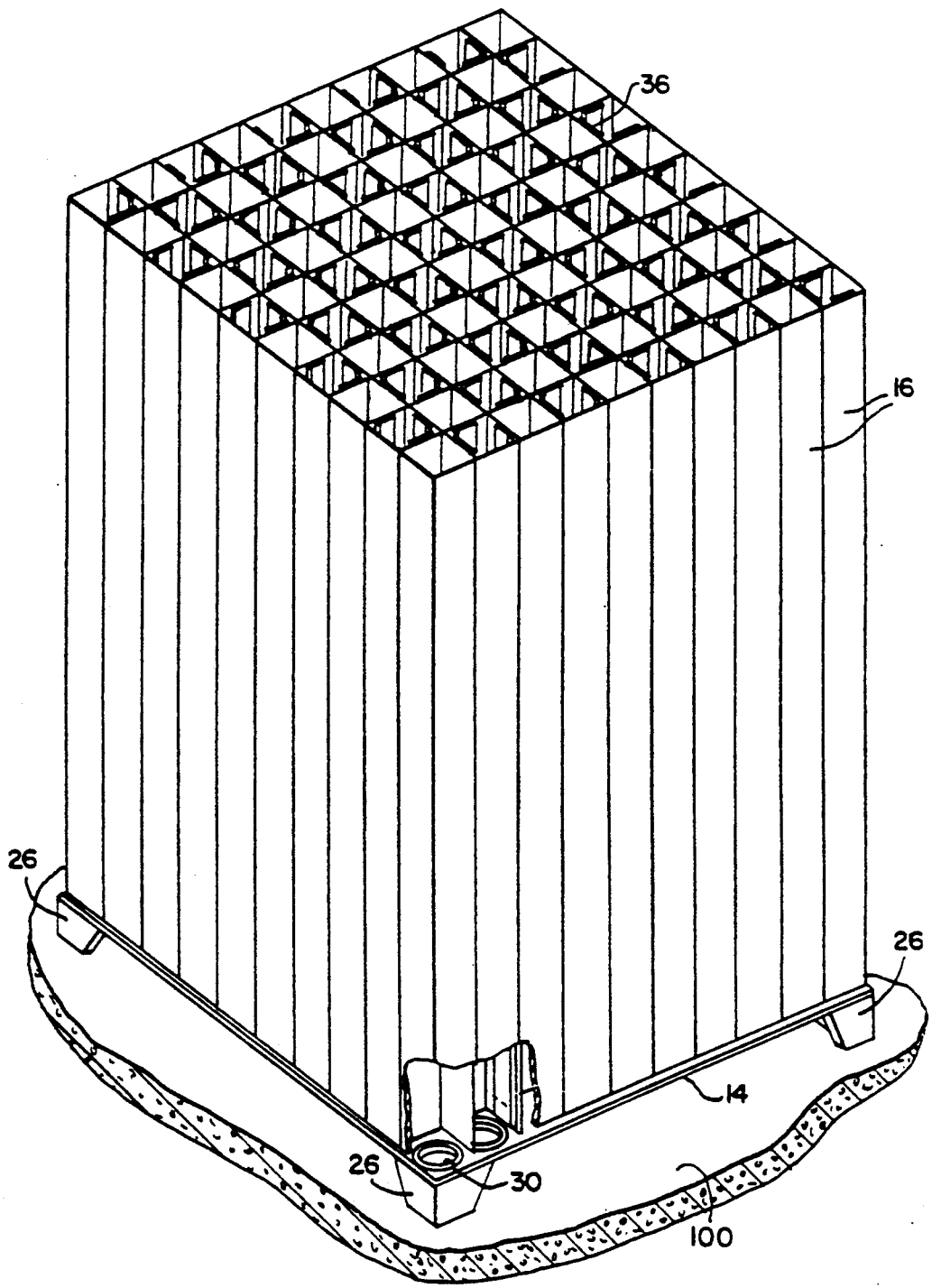
FIG. 1 is a view in isometric of a modular spent fuel rack of this invention.
Figure 3:
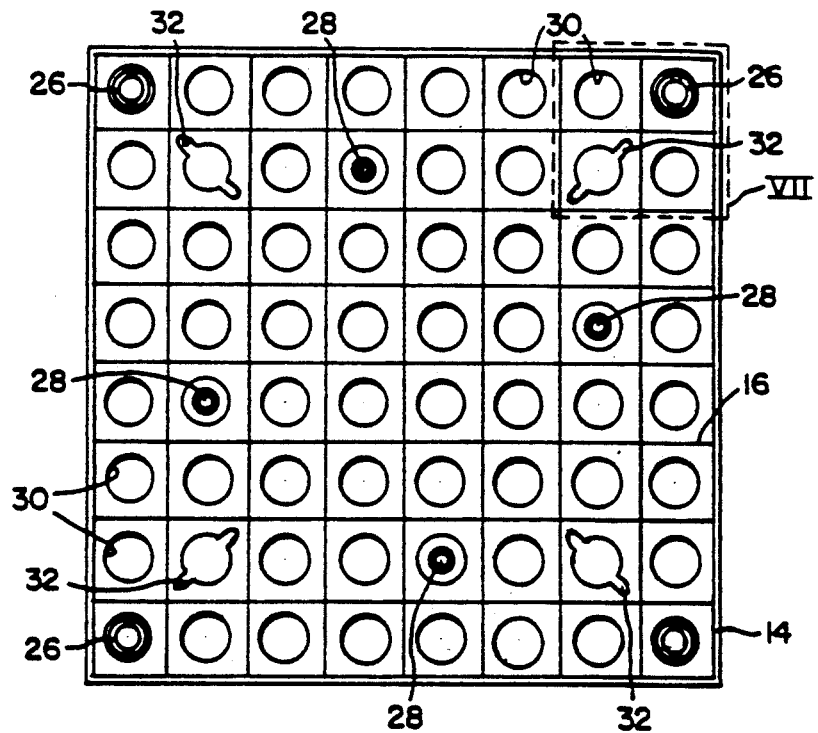
FIG. 3 is a plan view of the spent fuel rack illustrated in FIGS. 1 and 2.
Figure 2:
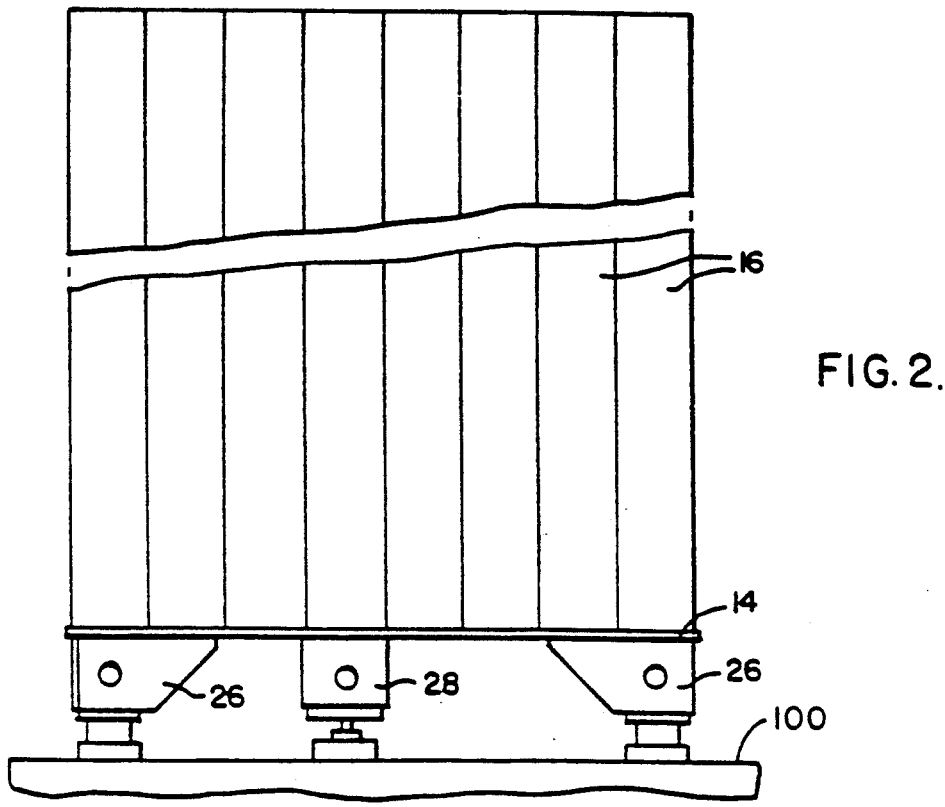
FIG. 2 is a front view in elevation of the spent fuel rack of FIG. 1.

Referring now to the drawings wherein like reference characters designate like or corresponding parts throughout the several views, there is shown in FIGS. 1-3 a fuel rack of modular design particularly adapted to receive fuel assemblies of the type used in boiling water reactors. The module includes a 0.50 inch thick base plate 14 designed to support multiple stainless steel containers or cells 16 each designed to hold a fuel assembly. Stability and rigidity is imparted to the modular unit by a base assembly and welds at the corners of each cell connecting all cells in a unitary structure. Adjustable leveling pads 26 located at the corners of the module and intermediate leveling pads 28 (FIGS. 2, 3) located at appropriate points beneath the base plate assures desired rigidity. Squareness and verticality in the module are also assured by leveling the base plate to a horizontal position.

Figure 7:
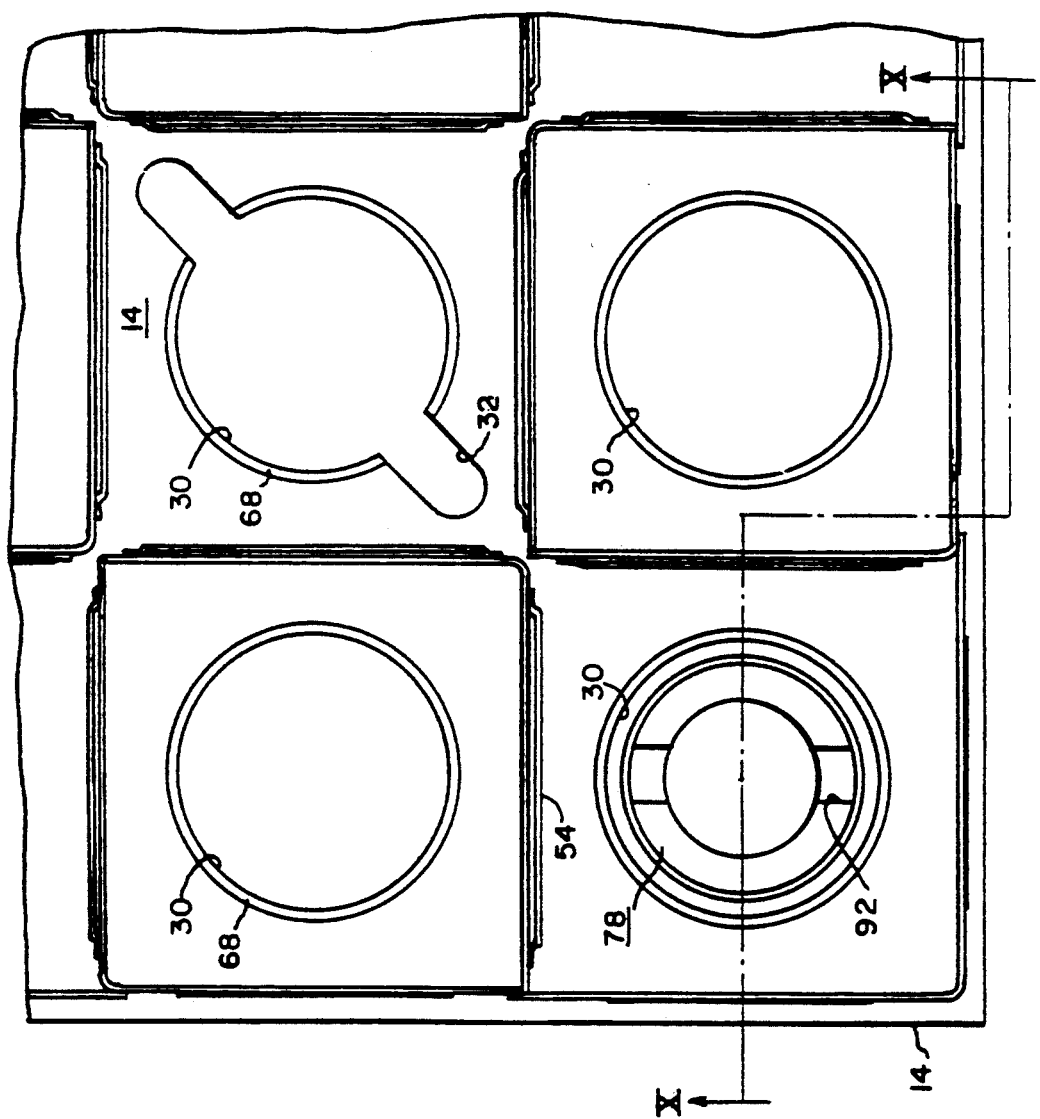
FIG. 7 is a plan view of the upper right-hand corner as viewed in FIG. 3 and shown in square VII of the module shown in FIG. 3.
Figure 10:
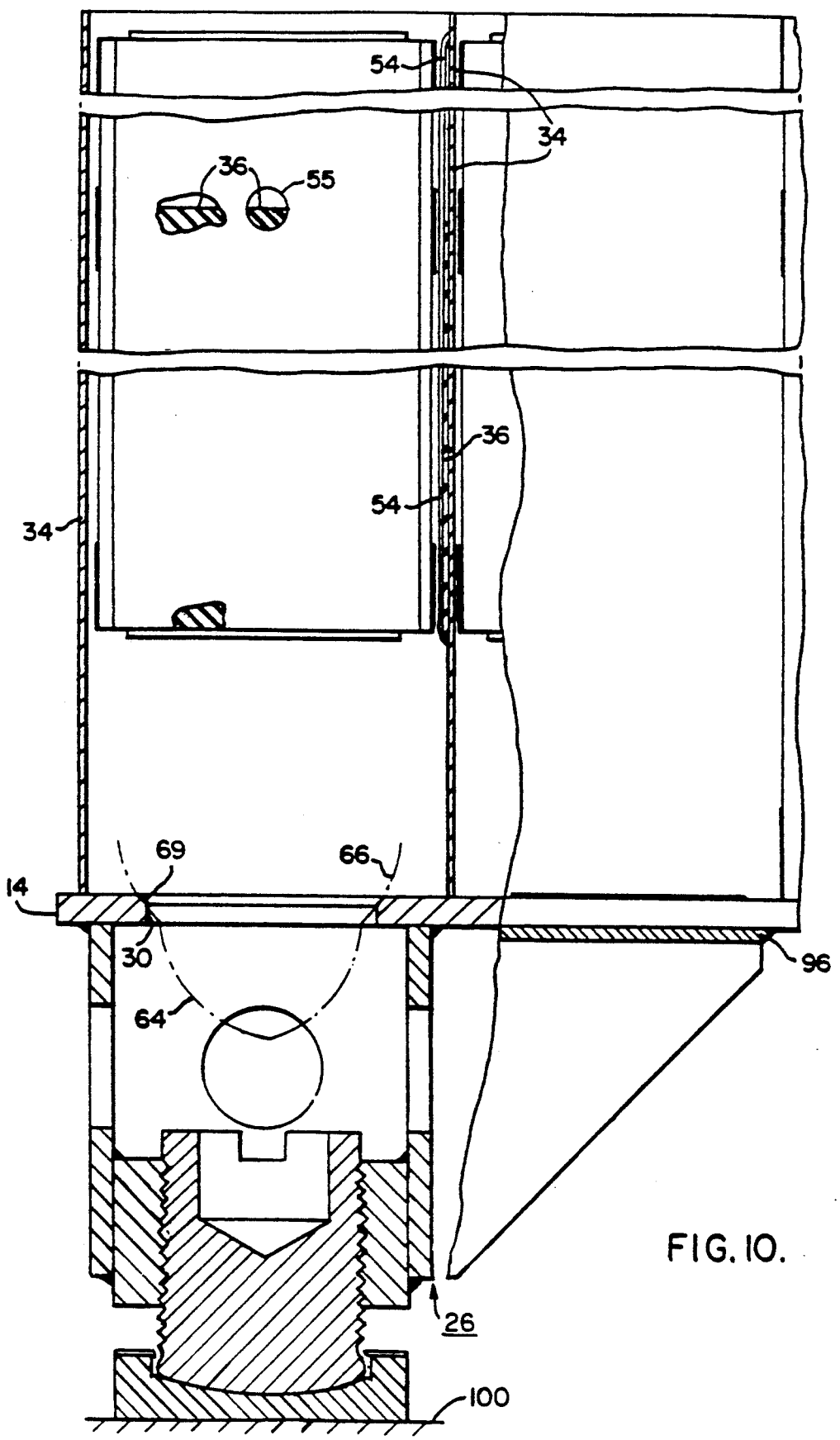
FIG. 10 is a view in section taken along lines X—X of FIG. 7 illustrating the arrangement used for leveling the base plate and cells mounted thereon.

As more clearly shown in FIGS. 3, 7 and 10, the base plate 14 includes multiple openings 30 of a design and size compatible with the configuration of the bottom nozzle of a fuel assembly adapted to be placed in each cell. In addition to receiving and supporting the bottom end of a fuel assembly, openings 30 provide a natural circulation flow path upwardly to assure proper cooling of the stored fuel assemblies by water or other coolant medium. Openings 30 further provide access to the leveling pads 26 while the openings in the central part of plate 14 provide access to the interior leveling pads 28. As more fully described hereafter, other openings have cut-away sections 32 which are particularly designed to receive a lifting tool for lifting and transferring the plate and/or the module to different locations.

Figure 5:
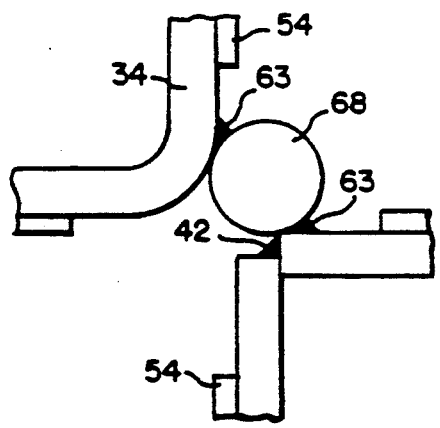
FIG. 5 is a detailed view of the connecting arrangement used for joining two adjacent cells where the gap between cells is of optimum size.
Figure 6:
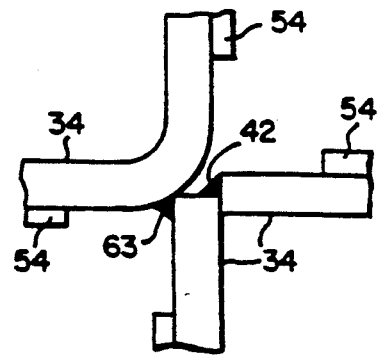
FIG. 6 is a view similar to FIG. 5 but showing how the adjacent cells are welded together when the cells are closer than the optimum distance.

As illustrated in FIGS. 4-6, the spent fuel rack module is substantially different from prior art designs inasmuch as no space exists between adjacent cells. The cells 16 shown are manufactured from a number of L-shaped sections 34 of a height sufficient to extend higher than the height of a fuel assembly and of a length and width just slightly in excess of those dimensions of a fuel assembly. To import strength and stability to the cells, the cell walls are made of 0.075 inch stainless steel although cell walls of different thicknesses may be used depending on the design criteria for the particular application. Neutron absorbing material 36, more fully described hereafter, is attached along the length and on the outside cell wall surfaces to help preclude the transfer of neutrons from one fuel assembly to another located in adjacent cells. All of the cells in the fuel rack module except those on the fuel rack periphery have neutron absorbing material on all four sides.

Each inner cell is made up of two L-shaped sections 34, and to provide simplicity in the manufacturing operations, neutron absorbing material is attached to the outer side of the walls of both L-shaped sections. To form a complete cell, one of the two thusly formed manufacturing sections 34 is placed in contact with, or in substantial contact with the corresponding longitudinal edges on the other sections. When these abutting edges of the two L-shaped sections are joined together by welds 42 (FIG. 5), a complete cell is formed of a size sufficient to accept a fuel assembly. The cell is enclosed by neutron absorbing material 36 on all four walls (FIG. 1) and the material on these walls serves the same function in absorbing neutrons from fuel assemblies in the adjacent cells. When the cells of a complete module are constructed in this manner, examination of FIG. 4 will show that every alternate cell is formed by the L-shaped sections which surround it. Note for example that the cell designated 44 is formed by walls 46, 48, 50, and 52. Each of these walls also comprise one wall of each cell which surround the cell 44. Cells which are thusly formed by the L-shaped walls are designated C and those cells which share the walls of the C cell are designated O.

The neutron absorbing material 36 prefereably comprises Boraflex which is an elastomeric silicone polymer matrix manufactured by Brand Industrial Services, Inc. of Parkridge, Ill. Other neutron absorbing materials may be used if desired. The Boraflex is approximately 0.045 inch thick and extends substantially the full length and width of the side wall on which it is mounted. A wrapper plate 54 (FIGS. 7, 10) of 0.035 inch stainless steel protects the Boraflex against physical damage and is welded along the edges to the L section wall surfaces. The wrapper plate 54 may terminate short of the end of each L-shaped section as shown in FIG. 10, or extend to the complete end. An inspection hole 55, FIG. 10, is used to visually verify proper placement of the neutron absorber material. Also, it will be noted that each alternate cell on the module periphery is closed by a panel 58, FIG. 4, which extends the cell complete length.

To form a spent fuel rack, all the L-shaped sections are assembled into cells as described above, and with this construction, the interior of each cell, other than those cells located on the module periphery, is bounded by walls having neutron absorbing material located either on the inside or the outside walls of a particular cell. Since the corner cells of the module do not require neutron absorbing material on its outside walls, the L-shaped sections 56 located at the corners comprise only stainless steel plate having their longitudinal edges welded to adjacent L-shaped sections on the module. When thus welded, each corner cell is then of a size and configuration to accept a fuel assembly.

FIGS. 4-6 illustrate how the L-shaped sections are welded together to form cells. Variations in the characteristics of the stainless steel material after being exposed to varying temperatures and stresses during the manufacturing process, produces slight distortion in the material such that the L section longitudinal edges do not always fall in a vertical plane. Usually the longitudinal edges can be welded along their complete length as shown in FIGS. 5 and 6 wherein weld 42 metallurgically joins adjacent L-shaped sections 34. In the event the adjacent L sections of adjacent cells to be joined are spaced a distance greater than that which can be bridged by a single weld, such as weld 63, 0.81 inch spacer wire 68 shown in FIG. 5, is welded in the gap formed at the intersection of the L sections of adjacent cells. Separate welds 63 are then made between each section and the wire spacer and along their complete height to provide stability to the fuel rack module. Since the space between adjacent sections may vary, it is evident that spacer wire, or other appropriate filler material, of different diameters or strips of different thicknesses and lengths may be welded to the adjacent L sections to hold the parts together.

The base plate 14 illustrated in FIGS. 3, 7 and 10 includes openings 30 which receive the bottom nozzle 64 (FIG. 10) of a fuel assembly adapted to be placed in the opening 30 provided in each cell 16. As shown in FIG. 10, the plate opening 30 is of a size larger than the bottom nozzle 64 but smaller than an upper portion 66 thereof. The wall of opening 30 includes a bevel 64 complementary to the sides of the nozzle 64 which provides a surface area which supports a fuel assembly when positioned on the rack.

Figure 8:
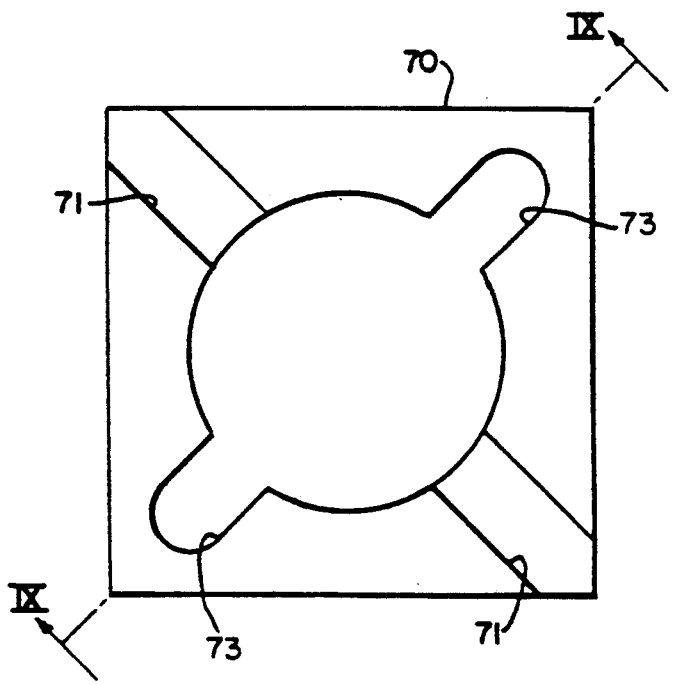
FIG. 8 is a bottom view of a support plate arranged to be welded to the underside of the base plate which supports the module and includes an opening of desired configuration for lifting the base plate and moving it from one location to another.
Figure 9:
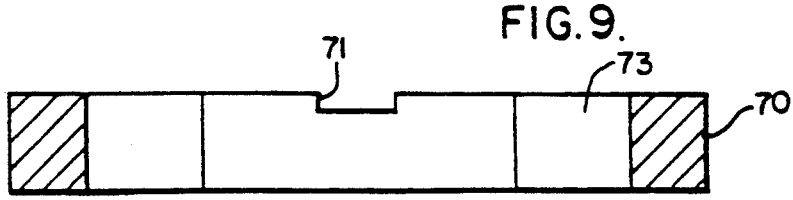
FIG. 9 is a view taken on lines IX—IX of FIG. 8.

The openings 30 are further modified, FIGS. 3, 8 and 10, to permit access to lifting apparatus for transferring the base plate 14 alone, or the base plate plus the stainless steel cells, from one location to another. To accomplish this, each of four openings 30 is provided with oppositely directed slots 32 (FIG. 7) of a size sufficient to accept lifting apparatus (not shown). This apparatus includes a base plate engaging mechanism which is of a length just sufficient to fit through slot 32 prior to being rotated 90° to a position for engagement with the underside of plate 14 for lifting purposes. To impart strength to the base plate 14 in the areas where the engaging mechanism of the lifting apparatus will engage the plate, a one-inch stainless steel block 70, FIGS. 8 and 9, having a lifting tool opening 73 of the same width as slot 32 in the base plate 14, is welded to the underside of the base plate and at the four positions indicated in FIG. 3. Depending on the size of base plate and module being lifted, either a greater or lesser number of openings may be provided for lifting purposes. The stainless steel block 70 includes in the underside a tool retaining slot 71. The slot is located in the manner shown to provide an impediment to rotation of the lifting apparatus after it is inserted through the slots 32 and rotated 90° to a plate lifting position. When the base plate is lifted, the retaining slot will prevent rotation of the lifting apparatus in the event it is jarred or vibrated during transfer of the base plate from one position to another. The openings 30 with the slots 32 and the blocks 70 constitute receiving and locking means for lifting apparatus which is wholly within the periphery of base 14.

The leveling apparatus beneath base plate 14 is similar to the design set forth in U.S. Pat. No. 4,820,472 inasmuch as the leveling pads are designed to conform to the slope of the pool floor and still achieve true squareness in the construction relative to vertical and horizontal axes. The leveling apparatus is also described in the parent of this application U.S. Pat. No. 4,900,505. As illustrated in FIGS. 7 and 10, each corner leveling pad 26 is mounted on the pool floor 100 (FIGS. 1, 2) for leveling base plate 14.

It will be apparent that many modifications and variations are possible in light of the above teachings. It therefore is to be understood that within the scope of the appended claims, the invention may be practiced other than as specifically described.

We claim:

1. For use in a storage pool for nuclear fuel assemblies, said pool containing a coolant and having a pool floor, a fuel rack module comprising a base plate to be disposed generally horizontally on said floor, a plurality of cells welded to said base plate, each said cell having elongated wall means for defining a transverse cross-sectional area for receiving a fuel assembly and a volume for accommodating said received fuel assembly, the outer walls of said cells of said plurality being wholly within the boundaries of said base plate, and a plurality of receptacles structured uniquely to accommodate the plate-engaging mechanism of lifting apparatus, said receptacles being spaced uniformly on said base plate for receiving and locking said plate-engaging mechanism for lifting the base plate alone or the base plate with said cells secured thereto, said receptacles being wholly within the periphery of said base plate and each said receptacle including a hole in said base plate having a contour such as to receive the lower end of a fuel assembly with slots extending from the periphery of said hole and a block secured to the underside of said base plate having a hole and slots coextensive with the hole and slots in said base plate, said hole and slots being dimensioned to pass said plate-engaging mechanism to the underside of said block, and said receptacle also having means in said block angularly displaced from said slots for locking said engaging mechanism, the blocks of all said receptacles being wholly within the boundary of said base plate.

2. For use in a storage pool for nuclear fuel assemblies, said pool containing a coolant and having a pool floor; a fuel rack module comprising: a base plate to be disposed generally horizontally on said floor, a plurality of cells mounted on said base plate, each said cell having elongated wall means defining a transverse cross-sectional area for receiving a fuel assembly and having a volume for accommodating said received fuel assembly, the outer walls of said cells of said plurality being wholly within the boundaries of said base plate, and means, in said base plate wholly within the periphery of said base plate, structured uniquely to accommodate lifting apparatus for lifting said module, said uniquely-structured means including at least one opening in the base plate and also including at least one member connected to the underside of said base plate, said member having an opening coincident with the opening in said base plate, said coincident opening being shaped to pass the plate engaging mechanism of the lifting apparatus and said member also including means for locking said lifting apparatus after it has passed through said openings.

3. For use in a storage pool for nuclear fuel assemblies, said pool containing a coolant and having a pool floor; a fuel rack module comprising a generally rectangular base plate to be disposed generally horizontally on said floor, a plurality of cells mounted on said base plate, each said cell having elongated wall means defining a transverse cross-sectional area for receiving a fuel assembly and having a volume for accommodating said received fuel assembly, the outer walls of said cells of said plurality being wholly within the boundaries of said base plate, and means, in said base plate wholly within the periphery of said base plate, structured uniquely to accommodate lifting apparatus for lifting said module, said uniquely-structured means including, near each corner of said base plate a member secured to the underside of said base plate, each said member and the base plate having coincident openings shaped to pass the plate-engaging mechanism of the lifting apparatus and each said member also including at each corner, means for locking said lifting apparatus, each of said members and said locking means being symmetrically disposed with respect to said base plate.

* * * * *